97 PLOWS.
Sod Cutter

Vol. 1

Thomas Spring
Bog and Brush Cutting

Patented 27 April 18[illegible]

CLASSIFICATION
75.58 +
DIVISION 4-27-1833

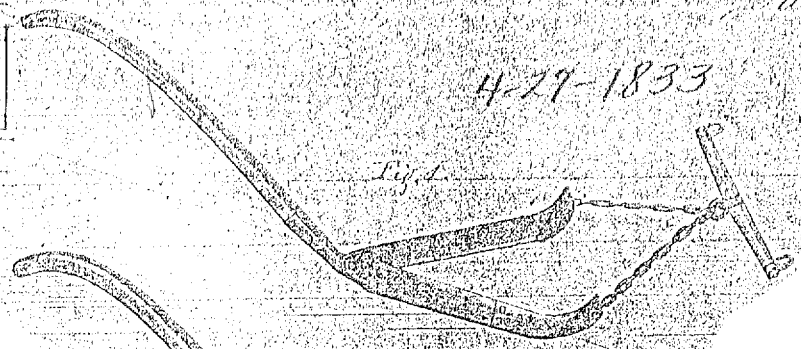

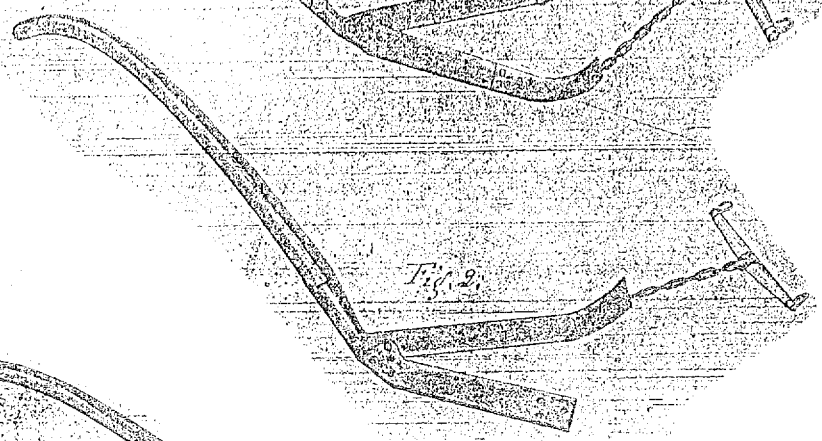

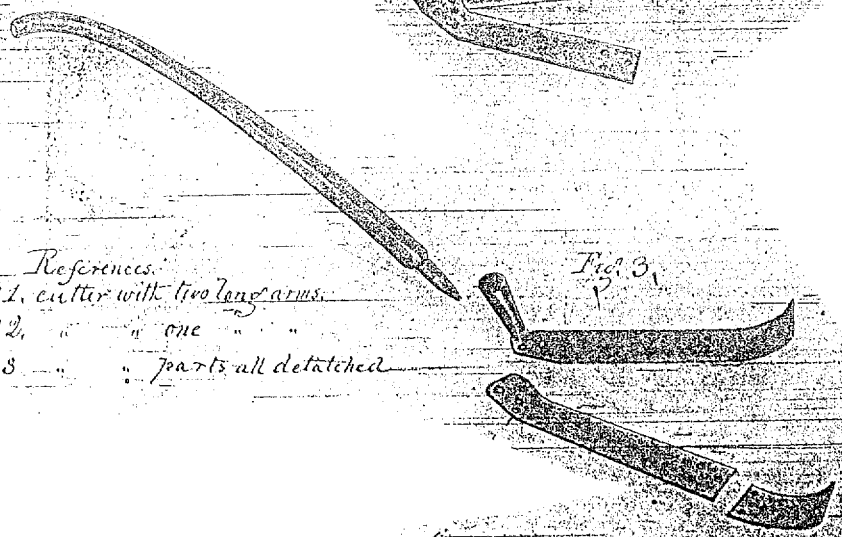

Fig. 1

Fig. 2

Fig. 3

References.
Fig. 1. cutter with two long arms.
Fig. 2. " " one " "
Fig 3 " " parts all detatched Patent Office ma[illegible]
Made under the direction of the Commissioner of Patents
in conformity with Act of Congress 3 March 1837.
[illegible]
Commissioner of Patents General Services Administration
National Archives and Records Service Washington, DC 20408

X7558 Apl. 27, 1833

Thomas Spring, of Granby Conn^t.
Letters Patent

The schedule referred to in these Letters Patent, and making part of the same, containing a description in the words of the said Thomas Spring, himself of his improvement in the machine for cutting up & destroying bogs & bushes. —

---

To all to whom these presents shall come: Be it known that I, Thomas Spring of Granby, in the County of Hartford & State of Connecticut, have invented a new & useful improvement in cutting up & destroying bogs & bushes, called the american bush & bog cutter, & that the following is a full & exact description of the construction & operation of the said machine, as invented by me. — This machine or instrument is formed by two blades or cutters, made of steel & iron or steel only with the edges turned inwards of convenient lengths & connected by screws at one end & diverging so that the two blades in form resemble the letter V. — The diverging ends are bent or curved upwards near the extremities so as to elevate them above the surface of the ground having therein loops or holes to which the propelling power may be connected. —
At the converging end of one of the cutters, there is made a socket bending upwards for the insertion of the handle by which to direct & apply the instrument. The other blade or cutter is like this, except that it is made without a socket, whole or in two pieces united by screws. This is attached to the other blade or cutter, between the socket & the edge by screws. Several holes are made at the point of junction & at various distances, from the sides of the blades or cutters so that by shifting the screws into them the distance between the blades or cutters may be increased or diminished, & their position be made more or less diverging. The upper end of the blade or cutter which consists of two ~~posts~~ parts united by screws or rivets may be taken off at pleasure & the instrument will be drawn or impelled by power applied to the end of the longest blade, instead of the ends of both. —

Drawing

108. X7558

For cutting up small or middle sized bogs or bunches of bushes, the instrument should be made entire by affixing the short part of the blade & the propelling power applied to the end of both blades or cutters but if they are large the instrument will operate best by taking off the upper part of the blade formed by two ~~two~~ pieces & the power applied at the end of the outer or longest blade - For the purpose of sharpening the blades or repairing them they can be taken apart by removing the screws. This machine or instrument may be drawn by horses or oxen - .
The person at the handle can so direct it when in motion as to receive the bogs or bushes between the blades & by the horizontal motion of the instrument they will be easily & rapidly severed from the earth - But if the bogs or bunches of bushes should be large, that part of the blade, which is united by screws to one of the blades & forms the upper or forward part of it. may be taken off & then the instrument can be applied more easily, & several times to the same side of the bog &c. & if necessary to different sides, until the purpose shall be effected.

Witnesses
Silas Rowley
Elisha Phelps

Thomas Spring

600 [illegible]

Exd.
M.G.C.